Patented June 27, 1950

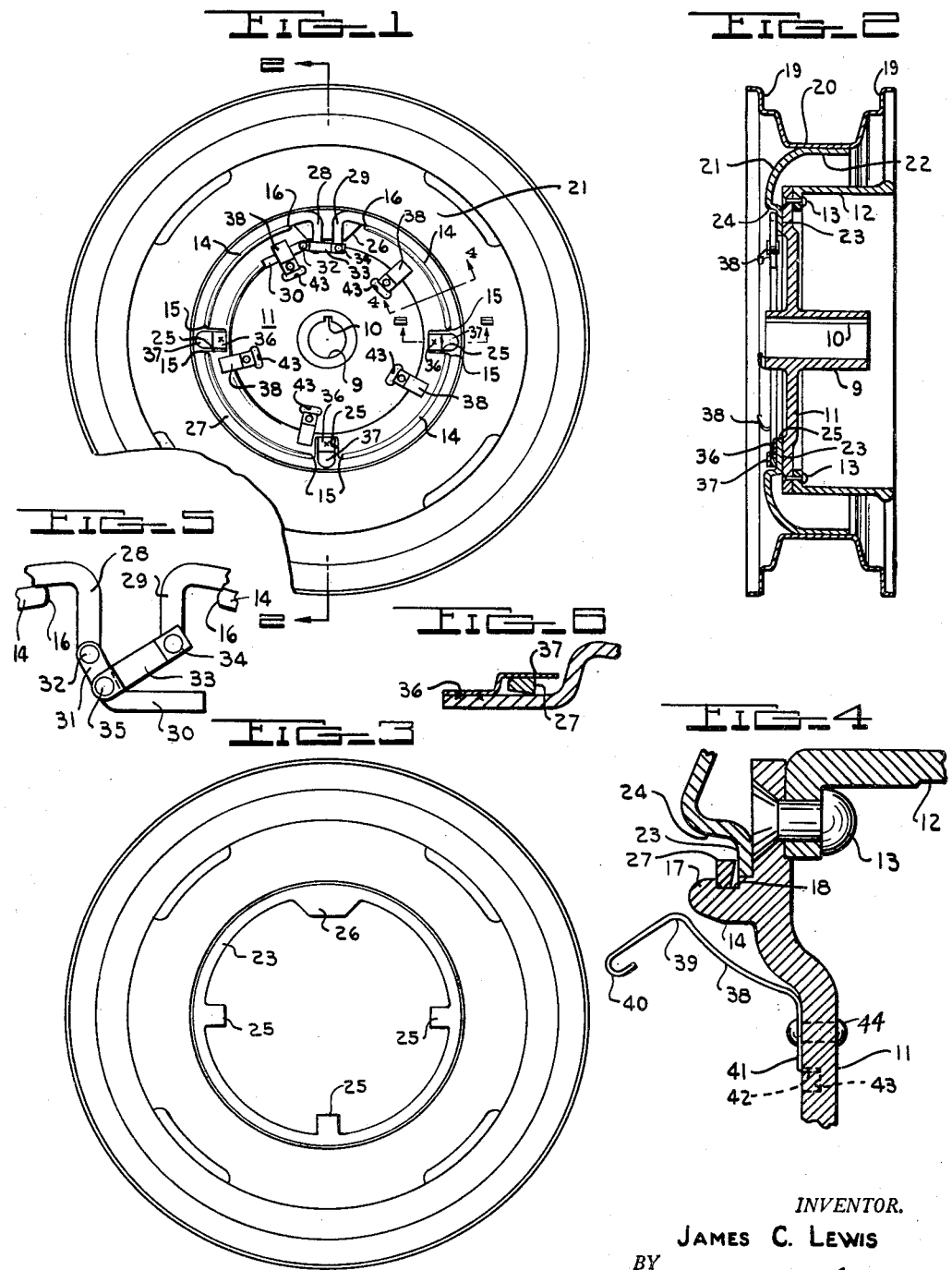

2,513,032

UNITED STATES PATENT OFFICE 2,513,032

VEHICLE WHEEL MOUNTING

James C. Lewis, Detroit, Mich.

Application September 25, 1947, Serial No. 776,141

10 Claims. (Cl. 301—9)

The present invention relates to new and useful improvements in a vehicle wheel mounting particularly but not exclusively adapted for automobile or airplane wheels.

An object of the present invention is to provide an improved wheel mounting which permits the ready mounting and dismounting of a demountable wheel from a wheel support by means which permit the ready and quick interlocking of the parts with each other to prevent relative rotation between the wheel and the wheel support.

Another object of the present invention is to provide such a wheel mounting wherein the wheel support provides a plurality of annularly spaced grooved flanges adapted to engage a plurality of mating driving lugs provided by said wheel to effect a positive driving engagement between said wheel and support therefor, and wherein said wheel provides an annular ring seat having an expansible split locking ring seated thereon for engaging said grooved flanges and locking said wheel to said wheel support.

Prior to the present invention, in demountable wheels employing a split ring for interlocking the wheel and wheel support, the split ring has been separable from the wheel when the latter is demounted. The efficient operation of the split ring and the ease and simplicity by which it may be employed to lock the wheel to its wheel support depends upon insertion of the split ring into a narrow retaining groove provided therefor by the wheel support. A frequent difficulty experienced with the separable split ring is that the latter may be easily bent when not supported in actual application on the wheel, particularly in garages where heavy tools, for example, may be carelessly or accidentally dropped on the ring, or on the highway during an emergency tire change when the ring may be accidentally stepped on or otherwise bent.

Accordingly, another object of the present invention is to provide improvements in a wheel mounting, having a demountable wheel adapted for interlocking with its wheel support upon the application of an expansible split ring, wherein the expansible split ring is maintained in a protected operative position as an inseparable unit with the wheel, free to be selectively expanded or contracted as desired.

Another object of the present invention is to provide an improved wheel mounting of the character described wherein the split ring is tapered to facilitate its insertion into the retaining groove provided therefor by the wheel support.

Another object of the present invention is to provide an improved wheel mounting wherein a simplified locking means, including a resilient split ring, is provided for locking the expansible split ring in its contracted wheel locking position.

Other objects of this invention will appear in the following description and appended claims, reference being had to the accompanying drawings forming a part of this specification wherein like reference characters designate corresponding parts in the several views.

In the drawings:

Fig. 1 is essentially a side elevation of a wheel mounting embodying the present invention and showing the wheel mounted on its wheel support and locked thereto by the split ring.

Fig. 2 is essentially a vertical section taken in the direction of the arrows along the line 2—2 of Fig. 1.

Fig. 3 is a side elevation of the wheel, essentially as shown in Fig. 1, with the split ring and ring retaining brackets removed.

Fig. 4 is an enlarged fragmentary section taken essentially in the direction of the arrows along the line 4—4 of Fig. 1.

Fig. 5 is an enlarged fragmentary side elevation showing the lever mechanism for expanding or contracting the split ring.

Fig. 6 is an enlarged fragmentary section through a ring retaining bracket, taken in the direction of the arrows essentially along the line 6—6 of Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

A particular embodiment of the present invention is shown by way of example in the drawings wherein a hub 9, having the keyway 10 for locking the hub 9 with an axle shaft, provides the annular disc-shaped wheel support 11, which latter is secured to the outer periphery of the brake drum 12 by the plurality of rivets or other securing means 13, Fig. 2. It will be apparent from the following that the brake drum 12 may be formed integrally with the wheel support 11 or may be eliminated entirely, other means being then employed to brake the wheel.

Extending outward from the outer or wheel receiving side of the wheel support 11 are the plurality of annularly disposed ring locks 14, concentric with the wheel support 11 and circumferentially spaced to provide the three small lug receiving spaces 15 and the one larger space 16. An annularly disposed ring engaging flange 17 projects radially outward from each ring lock 14 to provide the ring receiving channel or groove 18 within the outer periphery of each ring lock 14, Fig. 4. The wheel provides the tire retaining rims 19, the annular channel 20 within its outer periphery, and is reinforced by the annular web 21, which latter provides the annular flange 22 suitably secured to the channel base 20, as by welding or riveting for example, and the offset ring seat 23 lying in the plane of the wheel perpendicularly to its axis of rotation, Fig. 2.

The offset for the ring seat 23 provides the ring retaining movement limiting shoulder 24, Fig. 4. Projected radially inward from the inner periphery of the ring seat 23 are the plurality of spaced driving lugs 25, Fig. 3, three in the present instance, and the larger driving lug 26. An expansible resilient split locking ring 27, tapering from the outer to the inner periphery thereof, Fig. 6, and having the adjacent ends thereof extended essentially radially inward to provide the arms 28 and 29, is concentrically disposed to the wheel and seated on the ring seat 23.

Details of the extensible coupling or lever mechanism for expanding or contracting the expansible ring 27 are shown in Fig. 5 and comprise a dogleg lever having a long lever arm or link 30 and a relatively shorter arm or link 31 disposed thereto at an obtuse angle. The free end of the short link 31 is pivotally secured at 32 to the extremity of the ring arm 28. A connecting link 33, preferably longer than the short link 31, is pivotally secured at opposite ends at 34 and 35, respectively, to the extremity of the other ring arm 29 and to the short link 31 essentially at the juncture thereof with the link 30.

In the embodiment shown, it is preferred that the link 33 comprises two parallel link members, spaced above and below the ring 27, to permit extension of the end of the arm 28 into the space between the parallel link members 33 when the extensible coupling is pivotally moved to the closed position, Fig. 1.

In order to prevent the ring 27 from being accidentally detached from the wheel, or its position on the ring seat 23, a ring retaining bracket is provided by each of the driving lugs 25, each ring retaining bracket having the base 36 secured to the projection of its respective driving lug 25 within the inner periphery of the ring 27, as for example by welding. An arm 37 of each ring retaining bracket extends radially outward from its base 36 toward the shoulder 24 to overlie the split ring 27, Fig. 6, and thus to limit axial movement of the ring 27 from the ring seat 23. It is preferred that each overhanging bracket arm 37 lies adjacent the outer side of the ring 27 to loosely retain the latter between itself and the seat 23, thereby permitting freedom of expansion and contraction of the ring 27, yet retaining the latter as an inseparable unit with the wheel on the ring seat 23. Accordingly, the ring 27 may not be removed from its protected position on the seat 23 and is thus protected against accidental deformation.

The wheel support 11 in the embodiment shown is adapted to receive a conventional type of automobile hub cap (not shown) which may be clamped in place by the plurality of annularly disposed hub cap retaining spring clamps 38, each having the central radially outward projection 39, and the U-bend 40 at its outer extremity for concealing the sharp spring edge. A footing 41 of each spring clamp 38 is secured to the wheel support 11 by a rivet 44 and provides the inturned end 42 which projects into the opening 43 provided therefor in the wheel support 11 to prevent pivotal movement of the spring 38 about its fastening 44.

From the construction shown, it is apparent that the wheel of the present invention may be economically manufactured by slightly reforming a conventional wheel blank. For example the conventional wheel provides a disc or spoke structure around the nave thereof and which is detachably secured to a wheel support carried by a hub or axle. In the present instance, the central disc or spoke portion of the wheel is removed, leaving only the annular ring seat 23 and projecting driving lugs 25 and 26. At the same time, the movement limiting shoulder 24 is distinctly formed to provide an abutment for limiting the expansion of the split ring 27.

In application of the mounting, the lever operated linkage for expanding the ring 27 is moved to the expanded position shown in Fig. 5. The wheel is then mounted concentrically with the hub 10 and adjacent the outer wheel receiving side of the wheel support 11, which is abutted by the inner side of the ring seat 23. In the mounted position, the ring seat 23 fits concentrically around the ring locks 14, and the driving lugs 25 and 26 fit within their respective lug receiving spaces 15 and 16 provided between the separate locks 14. The lever 30 is then moved to the contracted position, Fig. 1, to contract the ring 27 within the ring receiving groove 18.

Entry of the ring 27 into the annular groove 18 is facilitated by the radial chamfer thereof, which latter causes the ring seat 23 to be tightly wedged against the abutting outer side of the wheel support 11 so as to securely clamp the wheel and wheel support 11 together essentially as an integral unit. The driving flanges 25 and 26 within their mating flange receiving openings 15 and 16 respectively contact the adjacent ends of the ring locks 14 so as to provide a positive stop against rotation of the wheel in either direction relative to its support.

The links 31 and 33, joined at their common juncture 35, Fig. 5, provide a self-locking extensible coupling between the arms 28 and 29 by virtue of the resiliency of the ring 27. The ring 27 is fully expanded when the links 31 and 33 extend in opposite directions from the common juncture 35. When the links 31 and 33 extend from their common juncture 35 in the same direction, essentially as shown in Fig. 1, the ring 27 is at its limit of contraction. In this position, the ring 27 is contracted against its inherent resiliency and is under tension impelling its expansion. As a consequence, upon movement of the common juncture 35 one way or the other from the position of dead center at maximum contraction, the resiliency of the ring 27 tends to move the links 31 and 33 to their fully expanded position. Clockwise rotation of the link or lever 30 from dead center about the common juncture 35 is limited by contact between the lever 30 and the inner periphery of the adjacent radially disposed ring lock 14. Thus, when the lever 30 is moved slightly clockwise from the dead center position, the tension of the contracted resilient split ring 27 forces the lever 30 firmly against the inner periphery of the ring lock 14. The ring 27 is preferably under sufficient tension in the locked or contracted position so that a relatively strong pull, usually requiring a pair of pliers, is required upon the lever 30 to move the latter counter-clockwise from its resiliently locked position against the ring lock 14. It is to be observed that when the wheel is in rotation, centrifugal force on the lever 30 tends to hold the latter even more securely in its locked position against the adjacent ring lock 14, thereby assuring a positive lock between the wheel and its wheel support when the latter are rotating. Obviously, when the lever 30 is moved to the counter-clockwise side of dead center, expansion of the ring 27 is permitted until the latter clears the groove 18, at which position the wheel may then be readily demounted from its wheel support 11.

By the foregoing disclosure, novel and useful improvements in a wheel mounting have been provided for securely interlocking a wheel and its wheel support by means of a resilient split ring wherein the ring is retained as an inseparable unit with the wheel to facilitate its application and also to protect the ring from accidental deformation, and wherein driving lugs are provided by the ring seat for interlocking with mating receptacles provided by the wheel support to positively eliminate relative rotation between the wheel and its wheel support.

I claim:

1. In a detachable wheel mounting, the combination of a wheel support, a wheel detachably mounted to said wheel support from an outer wheel receiving side thereof, an expansible split ring mounted in a ring seat provided by the outer side of said wheel, ring holding means secured to said wheel and adapted to loosely hold said split ring on said wheel operatively adjacent said ring seat, means for locking said wheel against outward axial movement relative to said wheel support and including a ring lock provided by said wheel support and extended outward therefrom within the inner periphery of said split ring and having a ring engaging flange overhanging said split ring, said split ring being expansible to clear said ring engaging flange for freeing said wheel for outward axial movement, said ring holding means including an annular disposed bracket means overlying said split ring adjacent the outer side thereof.

2. In a detachable wheel mounting, the combination of a wheel support, a wheel detachably mounted to said wheel support from an outer wheel receiving side thereof, an expansible split ring mounted in a ring seat provided by the outer side of said wheel, ring holding means secured to said wheel and adapted to said split ring on said wheel operatively adjacent said ring seat, means for locking said wheel against outward axial movement relative to said wheel support and including a ring lock provided by said wheel support and extended outward therefrom within the inner periphery of said split ring and having a ring engaging flange overhanging said split ring, said split ring being expansible to clear said ring engaging flange for freeing said wheel for outward axial movement, a pivotal linkage for selectively expanding or contracting said split ring and comprising a short link and a long link pivotally connected at one end of each at a common pivotal juncture, the other end of each link being pivotally connected to one of the ends of said split ring, said split ring being fully contracted against the resilience thereof upon pivotally moving said common juncture to a position of dead center with said links extending in the same direction therefrom, and being fully expansible upon pivotally moving said common juncture in one direction from said dead center, and means for resiliently locking said split ring in the contracted position past dead center and including a movement limiting stop for limiting the resiliently impelled pivotal movement of said common juncture in the other direction from said dead center.

3. In a detachable wheel mounting, the combination of a wheel support, a wheel detachably mounted to said wheel support from an outer wheel receiving side thereof, an expansible split ring mounted in a ring seat provided by the outer side of said wheel, ring holding means secured to said wheel and adapted to hold said split ring on said wheel operatively adjacent said ring seat, means for locking said wheel against outward axial movement relative to said wheel support and including a ring lock provided by said wheel support and extended outward therefrom within the inner periphery of said split ring and having a ring engaging flange overhanging said split ring, said split ring being expansible to clear said ring engaging flange for freeing said wheel for outward axial movement, said split ring having an essentially radially inward extending arm on each end thereof, a pivotal linkage for selectively expanding or contracting said split ring and comprising a short link and a long link pivotally connected at one end of each at a common pivotal juncture, the other end of each link being pivotally connected to one of each of said arms, said split ring being fully contracted against the resilience thereof upon pivotally moving said common juncture to a position of dead center with said links extending in the same direction therefrom, and being fully expansible upon pivotally moving said common juncture in one direction from said dead center, and means for resiliently locking said split ring in the contracted position past dead center and including a movement limiting stop for limiting the resiliently impelled pivotal movement of said common juncture in the other direction from said dead center.

4. In a detachable wheel mounting, the combination of a wheel support, a wheel detachably mounted to said wheel support from an outer wheel receiving side thereof, an expansible split ring mounted in a ring seat provided by the outer side of said wheel, ring holding means secured to said wheel and adapted to hold said split ring on said wheel operatively adjacent said ring seat, means for locking said wheel against outward axial movement relative to said wheel support and including a ring lock provided by said wheel support and extended outward therefrom within the inner periphery of said split ring and having a ring engaging flange overhanging said split ring, said split ring being expansible to clear said ring engaging flange for freeing said wheel for outward axial movement, said ring lock comprising a plurality of separate extensions from said wheel support and spaced by radial lug receiving openings, and means on said wheel to prevent rotation thereof relative to said wheel support and including a plurality of driving lugs extending within said lug receiving openings, said driving lugs comprising inward radial extensions of said ring seat, said ring holding means including a plurality of brackets selectively secured to said driving lugs within the inner periphery of said split ring and extending radially outward to overlie said split ring adjacent the outer side thereof.

5. In a detachable wheel mounting, the combination of a wheel support, a wheel detachably mounted to said wheel support from an outer wheel receiving side thereof, an annular ring seat provided by said wheel, an expansible split ring seated on the outer side of said ring seat and having the inner circumference thereof extended radially inward from said ring seat, means for locking said wheel against outward axial movement relative to said wheel support and including a plurality of circumferentially spaced ring engaging flanges within the inner periphery of said ring seat and projected outward from said wheel support to overhang the inner circumference of said split ring, said split ring being expansible to clear said ring engaging flange for freeing said wheel for outward axial movement, means provided by said ring seat to prevent relative rotational movement between said wheel and said wheel support and including a plurality of radially extending driving lugs interposed between and in driving engagement with said plurality of circumferentially spaced ring engaging flanges, said wheel having a movement limiting ring retaining shoulder adjacent the outer periphery of said split ring when the latter is expanded for clearing said ring engaging flanges and a plurality of brackets secured to said driving lugs within the inner periphery of said split ring and extending radially outward adjacent and overlying the outer side of said split ring for retaining the latter as an inseparable unit with said wheel.

6. In a detachable wheel mounting, the combination of a wheel support, a wheel detachably mounted to said wheel support from an outer wheel receiving side thereof, an annular ring seat provided by said wheel, an expansible split ring seated on the outer side of said ring seat and having the inner circumference thereof extended radially inward from said ring seat, means for locking said wheel against outward axial movement relative to said wheel support and including a plurality of circumferentially spaced ring engaging flanges within the inner periphery of said ring seat and projected outward from said wheel support to overhang the inner circumference of said split ring, said split ring being expansible to clear said ring engaging flange for freeing said wheel for outward axial movement, means provided by said ring seat to prevent relative rotational movement between said wheel and said wheel support and including a plurality of radially extending driving lugs interposed between and in driving engagement with said plurality of circumferentially spaced ring engaging flanges, said wheel having a movement limiting ring retaining shoulder adjacent the outer periphery of said split ring when the latter is expanded for clearing said ring engaging flanges and a plurality of brackets secured to said driving lugs within the inner periphery of said split ring and extending radially outward adjacent and overlying the outer side of said split ring for loosely holding the latter as an inseparable unit with said wheel.

7. In a detachable wheel mounting, the combination of a wheel support, a wheel detachably mounted to said wheel support from an outer wheel receiving side thereof, an annular ring seat provided by said wheel, an expansible split ring seated on the outer side of said ring seat and having the inner circumference thereof extended radially inward from said ring seat, means for locking said wheel against outward axial movement relative to said wheel support and including a plurality of circumferentially spaced ring engaging flanges within the inner periphery of said ring seat and projected outward from said wheel support to overhang the inner circumference of said split ring, said split ring being expansible to clear said ring engaging flange for freeing said wheel for outward axial movement, means provided by said ring seat to prevent relative rotational movement between said wheel and said wheel support and including a plurality of radially extending driving lugs interposed between and in driving engagement with said plurality of circumferentially spaced ring engaging flanges, said wheel having a movement limiting ring retaining shoulder adjacent the outer periphery of said split ring when the latter is expanded for clearing said ring engaging flanges, a plurality of brackets secured to said driving lugs within the inner periphery of said split ring and extending radially outward adjacent and overlying the outer side of said split ring for loosely holding the latter as an inseparable unit with said wheel, a pivotal linkage for selectively expanding or contracting said split ring and comprising a short link and a long link pivotally connected at one end of each at a common pivotal juncture, the other end of each link being connected to one end of said split ring, said split ring being fully contracted against the resilience thereof upon pivotally moving said common juncture to a position of dead center with said links extending in the same direction therefrom and being fully expansible upon pivotally moving said common juncture in one direction from said dead center, and means for resiliently locking said split ring in the contracted position past dead center and including a movement limiting stop for limiting the resiliently impelled pivotal movement of said common juncture in the other direction from said dead center.

8. In a wheel mounting wherein a wheel is detachably mountable with a wheel support therefor, the combination of an annularly disposed ring seat provided by an outer side of said wheel for supporting an expansible split ring, a plurality of radial inwardly extending driving lugs provided by said ring seat, an expansible split ring seated on said ring seat, an annularly disposed movement limiting ring retaining shoulder provided by said wheel and adjacent the outer periphery of said split ring when the latter is expanded, and a plurality of brackets secured to said driving lugs within the inner periphery of said split ring and extending radially outward adjacent and overlying the outer side of said split ring for retaining the latter as an inseparable unit of said wheel.

9. In a wheel mounting wherein a wheel is detachably mountable with a wheel support therefor, the combination of an annularly disposed ring seat provided by an outer side of said wheel for supporting an expansible split ring, a plurality of radial inwardly extending driving lugs provided by said ring seat, a split ring seated on said ring seat and means provided by said driving lugs for loosely holding said split ring as an inseparable unit therewith on said ring seat and including a plurality of brackets secured to said driving lugs within the inner periphery of said split ring and extending radially outward to overlie the outer side thereof.

10. In a wheel mounting wherein a wheel is detachably mountable with a wheel support therefor, the combination of an annularly disposed ring seat provided by an outer side of said wheel for supporting an expansible split ring, a plurality of radial inwardly extending driving lugs provided by said ring seat, a split ring seated on said ring seat, means provided by said driving lugs for loosely holding said split ring as an inseparable unit therewith on said ring seat and including a plurality of brackets secured to said driving lugs within the inner periphery of said split ring and extending radially outward to overlie the outer side thereof, said split ring having an essentially radially inward extending arm adjacent each end thereof, a pivotal linkage for selectively expanding or contracting said split ring and comprising a short link and a long link pivotally connected at one end of each at a common pivotal juncture, the outer end of each link being pivotally connected to one of each of said arms, said split ring being fully contracted against the resiliency thereof upon pivotally moving said common juncture to a position of dead center with said links extending in the same direction therefrom, and being fully expansible upon pivotally moving said common juncture in one direction from said dead center, and means for resiliently locking said split ring in the contracted position past dead center and including a movement limiting stop for limiting the resiliently impelled pivotal movement of said common juncture in the other direction from said dead center.

JAMES C. LEWIS.

REFERENCES CITED

The following references are of record in the file of this patent:

UNITED STATES PATENTS

| Number | Name | Date |
|---|---|---|
| 852,998 | Bridgers | May 7, 1907 |
| 1,139,151 | Arthur | May 11, 1915 |

FOREIGN PATENTS

| Number | Country | Date |
|---|---|---|
| 650,941 | France | Oct. 2, 1928 |

Certificate of Correction

Patent No. 2,513,032																																	June 27, 1950

JAMES C. LEWIS

It is hereby certified that error appears in the printed specification of the above numbered patent requiring correction as follows:

Column 9, line 19, for the word "outer" read *other*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*